US012564867B2

(12) United States Patent　　　(10) Patent No.: US 12,564,867 B2
Awiszus et al.　　　(45) Date of Patent: Mar. 3, 2026

(54) METHOD AND DEVICE FOR DETECTING CONTAINERS WHICH HAVE FALLEN OVER AND/OR ARE DAMAGED IN A CONTAINER MASS FLOW

(71) Applicant: KRONES AG, Neutraubling (DE)

(72) Inventors: Stefan Awiszus, Bad Aibling (DE);
　　　　　　　Udo Bayer, Thansau (DE); Josef
　　　　　　　Paukert, Kolbermoor (DE);
　　　　　　　Aurangzaib Ahmed Siddiqui,
　　　　　　　Rosenheim (DE)

(73) Assignee: KRONES AG, Neutraubling (DE)

( * ) Notice: Subject to any disclaimer, the term of this patent is extended or adjusted under 35 U.S.C. 154(b) by 448 days.

(21) Appl. No.: 17/756,744

(22) PCT Filed: Nov. 16, 2020

(86) PCT No.: PCT/EP2020/082172
　　　§ 371 (c)(1),
　　　(2) Date: Jun. 1, 2022

(87) PCT Pub. No.: WO2021/110392
　　　PCT Pub. Date: Jun. 10, 2021

(65) Prior Publication Data
　　　US 2023/0005127 A1　　Jan. 5, 2023

(30) Foreign Application Priority Data

Dec. 3, 2019　(DE) ..................... 10 2019 132 830.6

(51) Int. Cl.
　　　*B07C 5/34*　　　　(2006.01)
　　　*G06T 7/00*　　　　(2017.01)
　　　　　　(Continued)
(52) U.S. Cl.
　　　CPC .......... *B07C 5/3408* (2013.01); *G06T 7/0004*
　　　　　　(2013.01); *G06T 7/70* (2017.01);
　　　　　　(Continued)

(58) Field of Classification Search
　　　CPC .......... B07C 5/3408; B07C 2501/0063; G06T
　　　　　　7/0004; G06T 7/70; G06T 2207/10144;
　　　　　　(Continued)

(56) References Cited

U.S. PATENT DOCUMENTS 10,087,017 B2 * 10/2018 Klotz .................... B65G 43/08
2017/0264883 A1 * 9/2017 Hayashi ............... H04N 13/296
　　　　　　(Continued)

FOREIGN PATENT DOCUMENTS

CN　　　10600904 A　　10/2016
CN　　　110154272 A　　8/2019
　　　　　　(Continued)

OTHER PUBLICATIONS

ISA European Patent Office, International Search Report Issued in Application No. PCT/EP2020/082172, Feb. 17, 2021, WIPO, 5 pages.

(Continued)

*Primary Examiner* — Tom Y Lu
(74) *Attorney, Agent, or Firm* — McCoy Russell LLP

(57)　　　ABSTRACT

Method for detecting containers which have fallen over and/or are damaged in a container mass flow, wherein the containers in the container mass flow are transported vertically on a transporter, wherein the container mass flow is captured as an image data stream using at least one camera, and wherein the image data stream is evaluated by an image processing unit, wherein the image data stream is evaluated by the image processing unit using a deep neural network in order to detect and locate the containers which have fallen over and/or are damaged.

13 Claims, 5 Drawing Sheets

(51) Int. Cl.
| | |
|---|---|
| *G06T 7/70* | (2017.01) |
| *G06V 20/10* | (2022.01) |

(52) U.S. Cl.
CPC ...... *G06V 20/10* (2022.01); *B07C 2501/0063* (2013.01); *G06T 2207/10144* (2013.01); *G06T 2207/10152* (2013.01); *G06T 2207/20081* (2013.01); *G06T 2207/20084* (2013.01); *G06T 2207/30108* (2013.01)

(58) Field of Classification Search
CPC . G06T 2207/10152; G06T 2207/20081; G06T 2207/20084; G06T 2207/30108; G06V 20/10; G05B 13/027; G06F 18/24133
See application file for complete search history.

(56) References Cited

U.S. PATENT DOCUMENTS

| | | | |
|---|---|---|---|
| 2017/0267462 A1 | 9/2017 | Klotz | |
| 2018/0328813 A1* | 11/2018 | Webb | ...................... G01M 3/34 |

| | | | |
|---|---|---|---|
| 2019/0118226 A1 | 4/2019 | Shibasaki | |
| 2020/0282910 A1* | 9/2020 | Nagasamy | ............... B60D 1/62 |
| 2024/0017935 A1* | 1/2024 | Kikuchi | ................. B07C 5/342 |

FOREIGN PATENT DOCUMENTS

| | | | |
|---|---|---|---|
| CN | 110225871 A | 9/2019 |
| DE | 20110686 U1 | 8/2002 |
| DE | 102016124400 A1 | 6/2018 |
| EP | 2295156 A2 | 3/2011 |
| JP | 2019196964 A | 11/2019 |
| WO | 2008116546 A2 | 10/2008 |
| WO | 2019171124 A1 | 9/2019 |

OTHER PUBLICATIONS

Liang, Q. et al., "Real-time comprehensive glass container inspection system based on deep learning framework," Electronic Letters, vol. 55, No. 3, Feb. 1, 2019, 2 pages.
China National Intellectual Property Administration, Office Action Issued in Application No. 202080083581.3, Jun. 5, 2024, 11 pages. (Submitted with Partial Translation).

\* cited by examiner

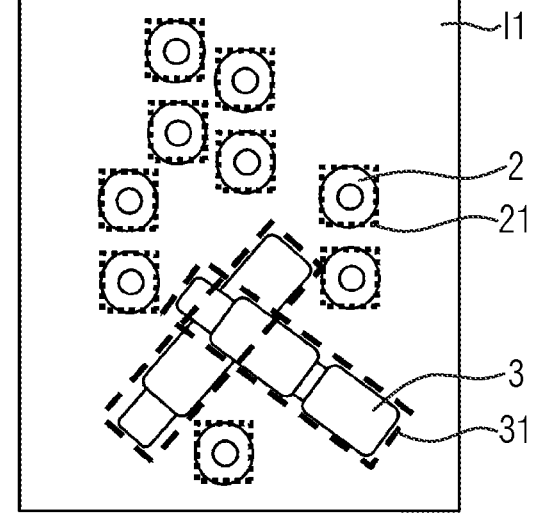
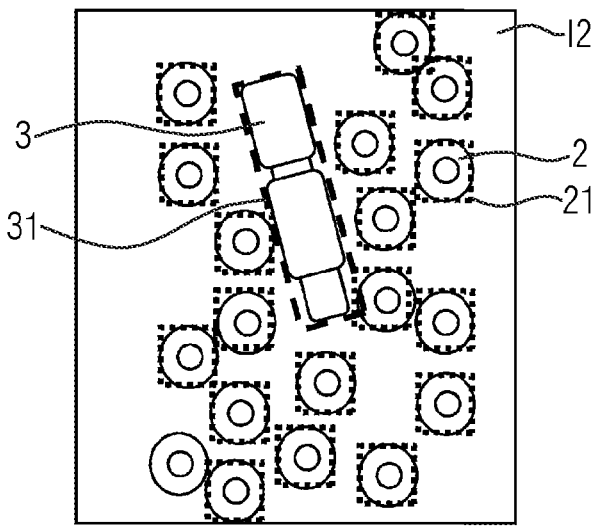
FIG. 2

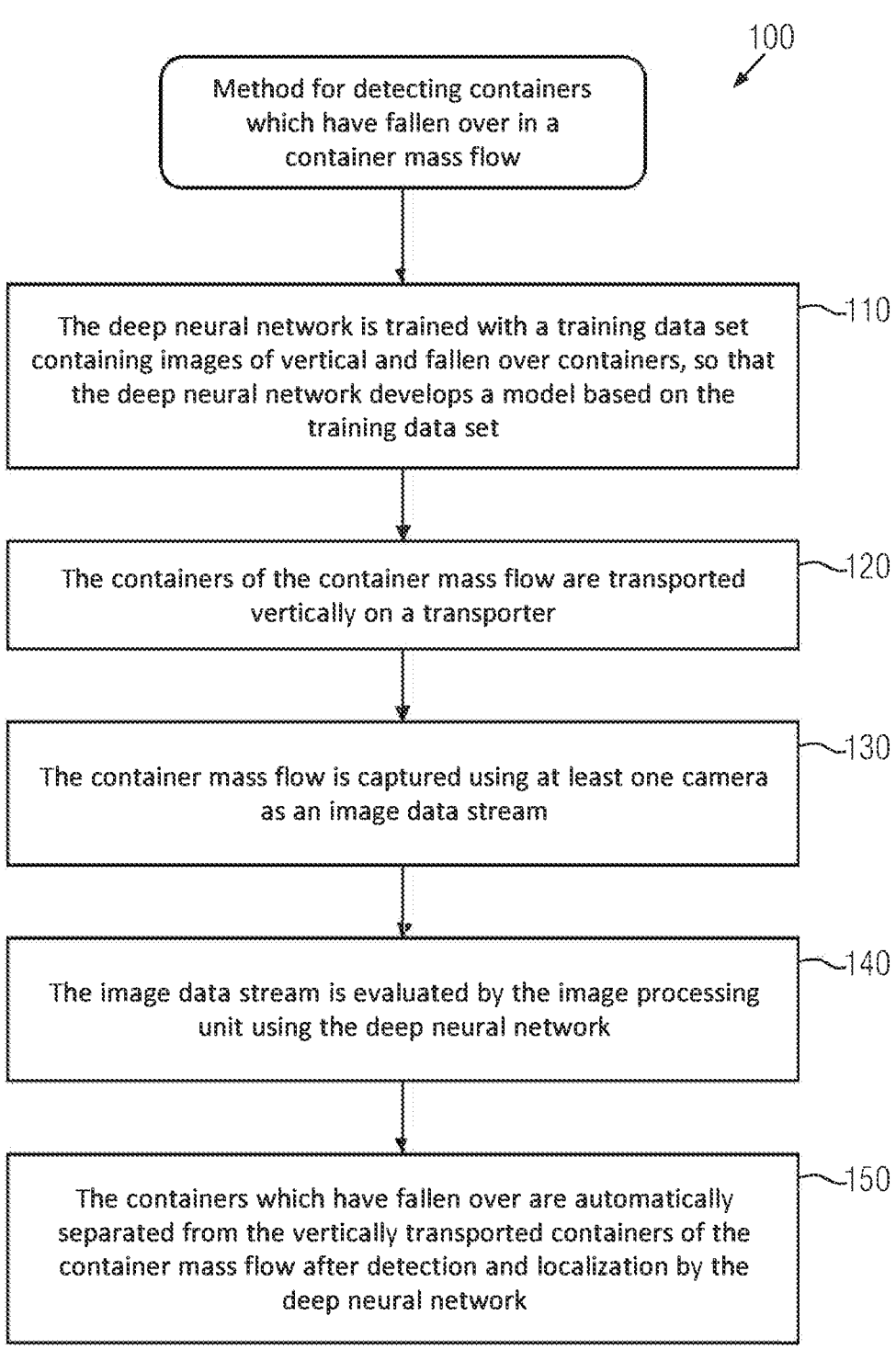

100

Method for detecting containers
which have fallen over in a
container mass flow

The deep neural network is trained with a training data set
containing images of vertical and fallen over containers, so that
the deep neural network develops a model based on the
training data set                                                    ~110

The containers of the container mass flow are transported
vertically on a transporter                                         ~120

The container mass flow is captured using at least one camera
as an image data stream                                             ~130

The image data stream is evaluated by the image processing
unit using the deep neural network                                  ~140

The containers which have fallen over are automatically
separated from the vertically transported containers of the
container mass flow after detection and localization by the
deep neural network                                                 ~150

FIG. 3

METHOD AND DEVICE FOR DETECTING CONTAINERS WHICH HAVE FALLEN OVER AND/OR ARE DAMAGED IN A CONTAINER MASS FLOW

CROSS REFERENCE TO RELATED APPLICATIONS

The present application is a U.S. National Phase of International Application No. PCT/EP2020/082172 entitled "METHOD AND DEVICE FOR DETECTING CONTAINERS WHICH HAVE FALLEN OVER AND/OR ARE DAMAGED IN A CONTAINER MASS FLOW," and filed on Nov. 16, 2020. International Application No. PCT/EP2020/082172 claims priority to German Patent Application No. 10 2019 132 830.6 filed on Dec. 3, 2019. The entire contents of each of the above-listed applications are hereby incorporated by reference for all purposes.

TECHNICAL FIELD

The invention relates to a method and device for detecting containers which have fallen over and/or are damaged in a container mass flow.

BACKGROUND AND SUMMARY

In beverage processing systems, it is common practice to transport the containers between individual container handling machines as a container mass flow vertically on a transporter. It can occasionally happen that individual containers fall over during transport and can therefore no longer be processed properly by the subsequent container handling machine or cause a jam. Consequently, the containers which have fallen over must be detected in the container mass flow in order to remove them subsequently. It is also conceivable that damaged containers are detected in the container mass flow and removed from it.

DE 201 10 686 U1 discloses a device for detecting containers lying on a multi-track transporter by means of sensors arranged above them. Contactless ultrasonic sensors are used as sensors.

US 2017/0267462 A1 discloses a device and a method for intervention on a conveyor belt. The conveyor belt is monitored by a sensor, for example an ultrasonic or laser sensor. Lying products can be removed with a gripping tool.

Furthermore, EP 2 295 156 A2 proposes a conveyor system with a device for detecting articles which have fallen over and methods for controlling it, wherein the conveyed objects or articles are optically detected by a laser scanner within a defined area.

WO 2008/116546 A2 discloses a method for monitoring, controlling and optimizing filling systems for foodstuffs, in particular for beverage bottles. An optoelectronic detection system with a thermal imaging camera is proposed for controlling or monitoring the system, wherein methods of image analysis and/or object recognition are applied in the associated data processing system.

Disadvantageous with the known methods and devices is that they represent individual solutions, which must be adapted in each case to the different applications. For example, this is done by sensors adapted to the application and/or special programming of the image processing. Furthermore, they usually have to be precisely adapted to container parameters and are dependent on the ambient conditions.

It is therefore the object of the present invention to provide a method and a device for detecting containers which have fallen over and/or are damaged in a container mass flow, which is easier and more flexible to implement.

In order to solve the problem, the invention provides a method for detecting containers which have fallen over and/or are damaged in a container mass flow.

Due to the fact that the container mass flow is captured by the at least one camera as an image data flow and the image data flow is evaluated by the image processing unit with the deep neural network, the evaluation takes place on the basis of previously learned empirical values of the deep neural network, so that vertical and fallen over and/or damaged containers are detected. Because it is possible to train the deep neural network with images of a wide variety of container types and/or ambient conditions, it is then no longer necessary to adapt the evaluation of the image data stream in the specific application. Consequently, the method according to the invention is particularly flexible and easy to implement. In addition, the neural network is trained and maintained centrally here for a plurality of different beverage processing systems and/or container types. Consequently, the method according to the invention does not have to be set up on site at a customer's premises at great expense during commissioning or conversion of the beverage processing system using expert knowledge. In addition, the evaluation with the deep neural network is particularly reliable. This means that the method can be used particularly reliably in unattended operation, especially in night operation without personnel. Furthermore, the method offers the advantage of active accident and personal protection, since fallen over and/or damaged containers do not have to be removed manually from the container mass flow by the operating personnel. This applies all the more since the containers in the mass container flow are subject to dynamic pressure and intervention by the operating personnel to remove a container due to the sudden relief of the container flow involves a risk of accidents such as crushing and cutting.

The method for detecting containers which have fallen over and/or are damaged can be implemented in a beverage processing system. The method may be upstream or downstream of a container manufacturing process, cleaning process, filling process, capping process, and/or packaging process. In particular, the method may be used in a transport from a first container handling process to a subsequent, second container handling process.

Containers can be provided to accommodate beverages, foodstuffs, hygiene articles, pastes, chemical, biological and/or pharmaceutical products. The containers can be in the form of bottles, in particular plastic bottles, glass bottles or (metal) cans. Plastic bottles can be PET, PEN, HD-PE or PP bottles. Likewise, they can be biodegradable containers or bottles whose main components consist of renewable raw materials, such as sugar cane, wheat or corn. It is conceivable that the containers are provided with a closure.

Here, "vertical containers" can mean containers that stand on the transporter with a contact surface provided for transport. For example, the contact surface can be an annular surface area of a bottle base. Here, the "containers which have fallen over" can mean containers that lie on the transporter with a container side that deviates from the contact surface provided for transport, for example with a side surface.

It is conceivable, for example, that the transporter comprises a conveyor belt on which the containers are transported vertically into a detection area of the camera.

The transporter can be configured as a mass transporter with which the containers are transported in multiple rows. The containers can be transported vertically on the mass transporter. The mass transporter can thus transport at least 1.5 of the containers side by side, preferably at least two or even more of the containers side by side transverse to a transport direction. Here, "at least 1.5 of the containers" can mean that the containers are transported offset and/or in at least two interlocked rows. Transport in multiple rows can mean transport in several separate rows of containers next to each other or transport in a disordered manner. The mass transporter can comprise a conveyor belt and two railings arranged laterally thereon, which are spaced apart with a transport width of at least 1.5 containers transverse to the transport direction. In this way, the containers are guided on the conveyor belt with the railings during multi-row transport. However, the railings can also be spaced apart with at least two containers or even more containers. It is also conceivable that the mass transporter comprises at least one guide rail between the two railings, with which the containers are guided in several separate rows. The transporter may comprise at least one flexible belt, link belt chain and/or mass mat chain. It is also conceivable that the conveyor belt comprises several link belt chains next to each other, which are driven and/or controlled individually. This allows better control of the multiple-row transport and better distribution, build-up or reduction of the accumulation pressure created during mass transport. The conveyor belt can be mounted around two rollers and/or driven. Preferably, the mass transporter can comprise one or more drives, in particular an electric motor, which drives the conveyor belt.

The at least one camera may comprise a lens and an image sensor to optoelectronically detect the container mass flow. For example, the image sensor may comprise a CMOS sensor or a CCD sensor. It is conceivable that the image sensor comprises a line sensor or an area sensor. The at least one camera may be connected to the image processing unit via a data interface to transmit the image data stream. The data interface may comprise an analog or a digital data interface.

The image processing unit can process the image data stream with a signal processor and/or with a CPU. It is also conceivable that the image processing unit comprises a memory unit, one or more data interfaces, for example a network interface, a display unit and/or an input unit for this purpose. The image processing unit can split the image data stream into individual images, each of which is evaluated individually with the deep neural network. It is also conceivable that the image processing unit evaluates the image data stream with image processing algorithms, in particular filters and the like.

The deep neural network may include an input layer, an output layer, and at least two intervening hidden layers. The output layer may be connected to the input layer via the at least two hidden layers. The image data stream may be fed to the input layer, in particular images of the image data stream. Using the output layer, signals may be output to indicate, for each container, a probability of whether it is vertical or whether it has fallen over and/or whether it is damaged. In addition, the output layer can be used to output signals indicating the position of the respective container on the transporter. It is also conceivable that signals are output with the output layer as to how the containers are oriented in each case. The input layer, the at least two hidden layers and/or the output layer can each include neural nodes and/or be connected to each other via neural connections.

The deep neural network can be trained with a training data set of images of containers that are vertical and containers which have fallen over and/or are damaged, such that the deep neural network develops a model based on the training data set to distinguish the vertical and fallen over and/or damaged containers of the container mass flow from each other. This allows the deep neural network to be trained with a high number of different cases so that the evaluation is largely independent of container type and/or ambient influences. For example, the training dataset may include images of containers of different sizes, alignments, or positions. The images of the training data set can be captured with the at least one camera. It is conceivable that this is done in a test system or directly on site at an operator of the beverage processing system. It is also conceivable that a database with images of vertical and fallen over and/or damaged containers is created at the manufacturer of the beverage processing system in order to then use these with the training data set.

It is conceivable that the training data set includes images from the container mass flow of the beverage processing system of a beverage manufacturer and that the training data set is transmitted to the manufacturer of the beverage processing system (e.g., via the Internet) and that the deep neural network is then trained at the manufacturer with the training data set. This allows the deep neural network to be trained and/or tested centrally by experts.

The training data set can include images of the vertical and the fallen over and/or damaged containers with different container types. This allows the deep neural network to be trained particularly well for different container types.

It is also conceivable that at least one of the images of the training data set includes a combination of different container types. This allows particularly reliable detection and localization of different container types in a container mass flow.

The training data set can include images of the vertical and the fallen over and/or damaged containers with different ambient conditions, in particular illumination conditions. This allows the fallen over and/or damaged containers to be detected particularly well regardless of the ambient conditions. It is conceivable that the training data set includes images with different sun positions, illuminance levels and the like.

In the images of the training data set and/or in metadata of the images, the vertical and/or fallen over and/or damaged containers can be characterized, in particular via at least one surrounding box (bounding box). This allows the deep neural network to be provided with a particularly large amount of information about the vertical and/or the fallen over and/or the damaged containers. In addition, the surrounding box makes it possible for the training data set to contain information that describes the orientation and location of the vertical and/or the fallen over and/or the damaged containers.

The images of the training data set can be automatically duplicated to create further images with additional combinations of vertical and fallen over and/or damaged containers. This can significantly reduce the effort required to create the training data set. It is conceivable that image segments with one vertical or fallen over and/or damaged container each are created during the duplication process. The image segments can originate from an original data set. It is conceivable that the image segments are individually rotated and/or enlarged during duplication. It is also conceivable that at least one exposure parameter is changed for the image segments during duplication. Subsequently, the image segments can be reassembled to form the images of the training data set. In this way, a very large number of different images of the training data set can be provided via a few original images. The exposure parameter can mean a brightness and/or a contrast of an image segment.

The fallen over and/or damaged containers can be automatically separated from the vertically transported containers of the container mass flow after detection and localization by the deep neural network, in particular with a gripper arm or with a switch. This allows the fallen over and/or damaged containers to be removed from the transporter without interrupting the container mass flow. The gripper arm can, for example, be a robot with a gripping tool.

It is conceivable that the image data stream is continuously captured and divided into individual images by means of a sliding window, wherein the individual images are subsequently evaluated with the deep neural network. This makes it particularly easy to provide the image data stream for processing by the deep neural network. In this case, it is conceivable that the camera is configured as a line scan camera with which the container mass flow is continuously captured. By the sliding window, a sliding window algorithm can be meant here. In other words, the sliding window can be an image area of the image data stream that is continuously shifted by fixed steps.

Furthermore, to solve the problem, the invention provides a device for detecting containers which have fallen over and/or are damaged in a container mass flow.

Due to the fact that the container mass flow is captured by the at least one camera as an image data stream and the image processing unit comprises the deep neural network for evaluating the image data stream, the evaluation is performed on the basis of previously learned empirical values of the deep neural network, so that vertical and fallen over and/or damaged containers are detected. Since it is possible to train the deep neural network with images of different types of containers and/or ambient conditions, it is no longer necessary to adapt the evaluation of the image data stream in the specific application. Consequently, the method according to the invention is particularly flexible and easy to implement. In addition, the evaluation with the deep neural network is particularly reliable. This allows the method to be implemented particularly reliably in unattended operation, especially during nighttime operation without personnel. Furthermore, the device offers the advantage of active accident and personal protection, since fallen over and/or damaged containers do not have to be removed manually from the container mass flow by the operating personnel. This applies all the more since the containers in the mass container flow are subject to dynamic pressure among each other and intervention by the operating personnel to remove a container due to the sudden relief of the container flow involves a risk of accidents such as crushing and cutting.

The device for identifying the fallen over and/or damaged containers in the container mass flow can be arranged in a beverage processing system. It is conceivable that at least one container handling machine is arranged upstream and/or downstream of the transporter. In other words, the transporter can connect two container handling machines.

The device may comprise the features previously described with respect to the method, individually or mutatis mutandis in any combination.

The image processing unit may include a storage medium comprising machine instructions that, when executed with the image processing unit, evaluate the image data stream with the deep neural network. In other words, the image processing unit may include the deep neural network. It is conceivable that the storage medium comprises machine instructions that can be used to execute, at least partially, the method described above. In particular, the machine instructions can execute those parts of the method which are executed with the image processing unit and/or with the deep neural network.

BRIEF DESCRIPTION OF THE FIGURES

Further features and advantages of the invention are explained in more detail below with reference to the embodiments shown in the Figures. Therein:

FIG. 2 shows two exemplary images of the image data stream output by the camera of FIG. 1;

FIG. 3 shows an embodiment of a method according to the invention for detecting containers which have fallen over as a flow diagram;

DETAILED DESCRIPTION

Figure 1:
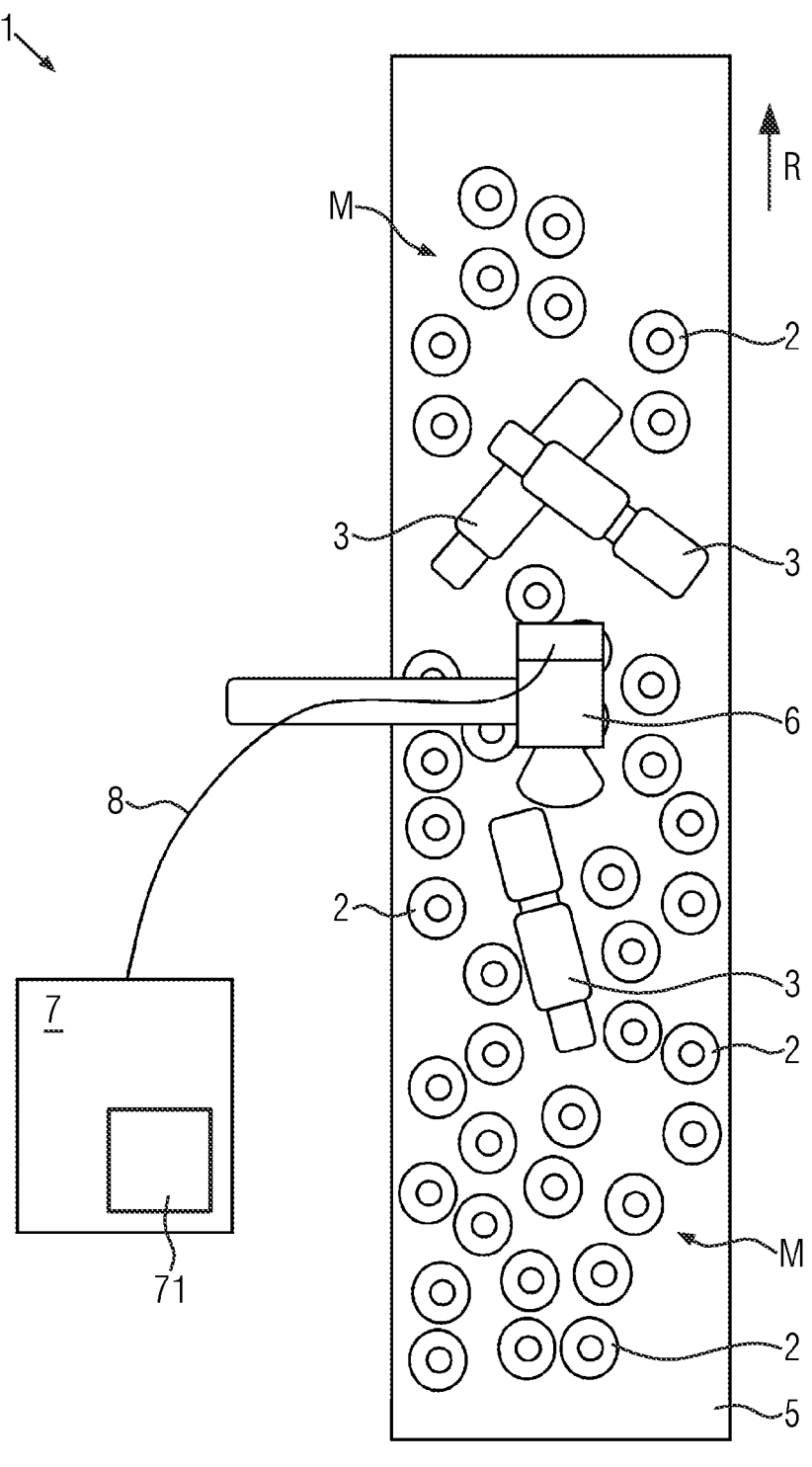
FIG. 1 shows an embodiment of a device according to the invention for detecting containers which have fallen over in a container mass flow in a top view.

FIG. 1 shows an embodiment of a device 1 according to the invention for detecting containers 3 which have fallen over in a container mass flow M in a top view. The transporter 5 can be seen, which is exemplarily configured here as a conveyor belt and on which the containers 2, 3 of the container mass flow are transported in the direction R. The transporter 5 is primarily configured to transport the containers 2 in a vertical position. However, some containers 3 can also be seen which have fallen over, for example as a result of vibrations or when the containers are being guided. It is also conceivable that the device is alternatively or additionally configured to detect damaged containers. Since the fallen over and/or damaged containers 3 cannot be properly processed upstream of a subsequent container handling machine or may cause a jam, they must be detected and removed from the transporter 5.

It can also be seen that the transporter 5 is configured as a mass transporter with which the containers 2 are transported in multiple rows. In the embodiment, the containers 2 are transported in a disordered manner next to each other. For this purpose, the transporter 5 comprises two railings, not shown in more detail, at right angles to the direction R (transport direction) on both sides, with which the containers 2 are guided laterally. In addition, the transporter 5 comprises a conveyor belt, for example a link belt chain and/or a mass mat chain, which is driven by a drive. On such a mass transporter, the containers 3 which have fallen over have a particularly disruptive effect on the flow of the other containers 2 and must therefore be detected. This circumstance applies in particular before the containers reach a container handling machine located downstream of the container flow.

For this purpose, the camera 6 is arranged on the transporter 5, which detects the vertical containers 2 and the fallen over containers 3 from diagonally above. The arrangement of the camera 6 is shown here only by way of example. It is also conceivable that several cameras are present which face from obliquely above in the same direction or in opposite directions. Also conceivable is an arrangement directly from above perpendicular to a transport surface of the transporter 5.

Thus, the camera 6 captures the container mass flow M as an image data stream and transmits it to the image processing unit 7 by means of the data interface 8 in order to evaluate the image data stream with the neural network 71.

For this purpose, the image processing unit 7 comprises a storage medium containing machine instructions which, when executed with the image processing unit 7, evaluate the image data stream with the deep neural network 71.

The neural network 71 is configured to detect and locate the containers 3 which have fallen over. Based on the evaluation, the containers 3 which have fallen over can then be removed from the transporter 5 with a switch not shown here or by means of a gripper arm.

FIG. 2 shows two exemplary images I1 and I2 of the image data stream output by the camera 6 from FIG. 1.

It is conceivable that the camera 6 comprises an area sensor with which the images I1, I2 are each captured over an area at one point in time. Alternatively, it is also conceivable that the camera 6 comprises a line sensor with which the image data stream is continuously captured and divided into individual images I1, I2 by means of a sliding window, wherein the individual images I1, I2 are subsequently evaluated with the deep neural network 71.

Furthermore, it can be seen in the images I1, I2 that after evaluation by the deep neural network 71, the vertical containers 2 are each characterized with a surrounding box 21. Furthermore, the containers 3 which have fallen over are also characterized with another surrounding box 31, which on the one hand marks it and on the other hand indicates its location and orientation. Based on this information, the exact position of the fallen over containers 3 on the transporter 5 can then be output as a signal or the fallen over container(s) 3 can be tracked by signal up to the switch not shown here and automatically sorted out.

In FIG. 3, an embodiment of a method 100 according to the invention for detecting containers 3 which have fallen over is shown as a flowchart. It can be seen that in step 110, the deep neural network is first trained with a training data set with images of vertical and fallen over containers, so that the deep neural network develops a model based on the training data set. Based on this model, the deep neural network can then recognize in operation what is a vertical container and what is a container that has fallen over.

The method 100 is described in more detail with reference to containers 3 which have fallen over. It is conceivable that the method 100 is alternatively or additionally configured to detect damaged containers. Accordingly, damaged containers not shown in more detail here are trained in the training data set. These containers may show deformations as well as broken containers.

The training data set can be obtained from a set greater than 1000, preferably greater than 5000, and more preferably greater than 10000 images.

In step 120, the containers 2 of the container mass flow are transported vertically on the transporter 5. It can occasionally happen that one of the containers 2 falls over and then lies on the transporter 5 as a fallen over container 3.

In order to detect the containers 3 which have fallen over, the container mass flow M is first captured with at least one camera 6 as an image data stream (step 130), which is then evaluated by the image processing unit 7 with the deep neural network 71 (step 140).

The containers 3 which have fallen over are automatically separated (step 150) from the containers 2 of the container mass flow that are transported vertically after detection and localization, for example with a gripper arm or with a switch.

Figure 4:
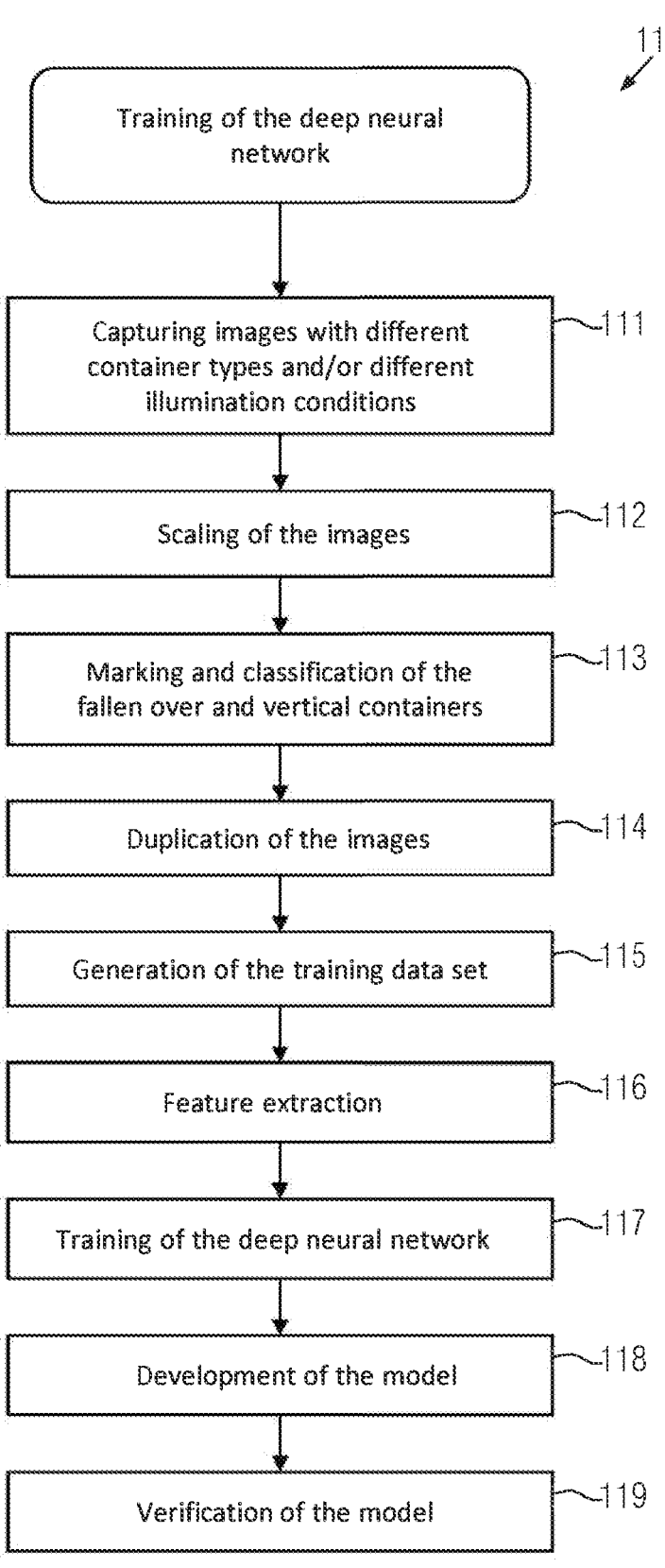
FIG. 4 shows an embodiment of a subsection of the method of FIG. 3 for training the deep neural network.

In FIG. 4, an embodiment of the subsection 110 of the method 100 of FIG. 3 for training the deep neural network 110 is shown in more detail as a flowchart.

First, in step 111, images of different container types and/or different lighting conditions are captured. It is conceivable, for example, that this is done on a test system or that images of the container mass flow M of different beverage processing systems are collected in a database.

Subsequently, the images are scaled to a standard dimension in step 112. This allows them to be evaluated uniformly.

In step 113, the containers 2, 3 which have fallen over and those that are vertical are marked and classified. This can be done manually, semi-automatically or automatically. For example, this can be done manually by an operator at a screen or with a particularly computationally intensive image processing algorithm. The marking can, for example, be a surrounding box and the classification can be a container type or size.

Subsequently, in step 114, the images are automatically duplicated to create further images with additional combinations of vertical and fallen over containers 2, 3. First, image segments are created each with an vertical or a fallen over container 2, 3, which are then individually rotated and/or enlarged for duplication. It is also conceivable that exposure parameters of the image segments are changed during duplication. Subsequently, the image segments can be assembled in various combinations as further images, from which the training data set is then generated in step 115.

In the subsequent step 116, features are automatically extracted by means of the deep neural network 71. For example, a multi-stage filtering method of the training data set is used. It is conceivable that edge filters or the like are used in this process to extract the outer boundary of each individual container 2, 3.

Feature extraction here can mean, in general terms, a method for detecting and/or locating distinguishing features of the containers 3 which have fallen over compared to the vertical containers 2 in the images of the training data set. As an alternative to automatic extraction using the deep neural network 71, this can also be done manually by an operator. For example, the extracted features may include a container closure, a contour of an vertical or fallen over container 2, 3, a container label, and/or light reflections. The extracted features may each include a feature classification, a 2D and/or 3D coordinate.

Subsequently, in step 117, the deep neural network 71 is trained with the training data set. In this context, the deep neural network 71 is iteratively given images of the training data set with the extracted features as well as the associated markings and classifications of the fallen over and vertical containers 2, 3. From this, the deep neural network 71 develops a model in step 118, with which the fallen over and the vertical containers 2, 3 can be recognized.

In the subsequent step 119, the model can then be verified using the training data set without predefining the markings and classifications. In this context, it is compared whether the deep neural network 71 actually recognizes the previously specified markings and classifications in the training data set. Likewise, further images with fallen over and vertical containers 2, 3 can be used for this purpose, on which the deep neural network 71 was not trained.

Figure 5:
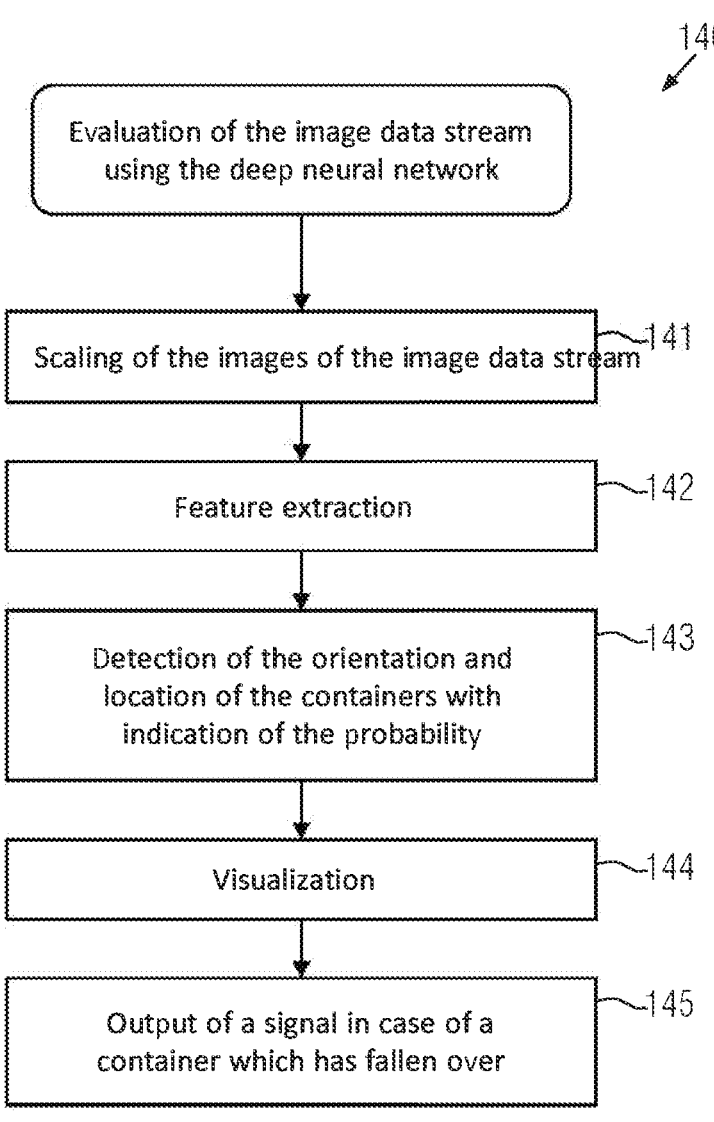
FIG. 5 shows an embodiment of a subsection of the method in FIG. 3 for evaluating the image data stream with the deep neural network.

In FIG. 5, the sub-step 140 of the method 100 from FIG. 3 for evaluating the image data stream with the deep neural network 71 is shown in more detail as a flowchart.

It can be seen that the images of the image data stream from FIG. 1 are first scaled. Thus, the evaluation works independently of the actual configuration of the camera.

Subsequently, in step 142, the features are extracted. This is done in the same way as described in step 116 with respect to FIG. 4.

Subsequently, in step 143, the deep neural network detects the orientation and location of the respective container 2, 3 and indicates a probability whether this container 2, 3 is transported lying or vertically on the transporter 5.

This information is then visualized in step 144 and displayed on a screen as shown in FIG. 2. This allows an operator to verify that the detection is proceeding properly.

Furthermore, if a container 3 has fallen over, a signal is output in step 145 to remove it from the transporter 5, for example with a switch or a gripper arm.

Since the container mass flow M is captured as an image data flow by the at least one camera 6 and the image data flow is evaluated by the image processing unit 7 with the deep neural network 71, the images of the image data flow can be evaluated on the basis of previously learned empirical values of the deep neural network 71 in order to classify the vertical and fallen over containers 2, 3 respectively. Since it is possible to train the deep neural network 71 with images of a wide variety of container types and/or ambient conditions, it is no longer necessary to adapt the evaluation of the image data stream in the specific application. Consequently, the method according to the invention is particularly flexible and can be easily implemented.

It is understood that features mentioned in the previously described embodiments are not limited to this combination, but are also possible individually or in any other combinations.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for detecting containers which have fallen over and/or are damaged in a container mass flow, wherein the containers of the container mass flow are transported vertically on a transporter, wherein the container mass flow is captured using at least one camera as an image data flow, and wherein the image data flow is evaluated by an image processing unit, wherein the image data flow is evaluated by the image processing unit using a deep neural network in order to detect and locate the containers which have fallen over and/or are damaged, the deep neural network is trained with a training data set comprising images of fallen over and/or damaged containers, such that the deep neural network develops a model based on the training data set to distinguish the fallen over and/or damaged containers from each other, the fallen over and/or damaged containers are characterized or marked in the images of the training data set and/or in metadata of the images, the images of the training data set are automatically duplicated to create further images with additional combinations of fallen over and/or damaged containers, image segments are generated during the duplication, each of the image segments comprising a vertical or fallen over and/or damaged container, and the image segments are individually rotated and/or enlarged during the duplication.

2. The method according to claim 1, wherein the training data set comprises images of the fallen over and/or damaged containers with different container types.

3. The method according to claim 2, wherein at least one of the images of the training data set comprises a combination of different container types.

4. The method according to claim 1, wherein the training data set comprises images of the fallen over and/or damaged containers with different ambient conditions.

5. The method according to claim 1, wherein in the images of the training data set and/or in the metadata of the images the fallen over and/or damaged containers are characterized by at least one surrounding box.

6. The method according to claim 1, wherein at least one exposure parameter is changed in the image segments during the duplication.

7. The method according to claim 1, wherein the fallen over and/or damaged containers are automatically separated from vertically transported containers of the container mass flow after detection and localization by the deep neural network.

8. The method according to claim 1, wherein the image data flow is continuously captured and divided into individual images by means of a sliding window, and wherein the individual images are subsequently evaluated with the deep neural network.

9. The method according to claim 1, wherein the transporter is configured as a mass transporter with which the containers are transported in multiple rows.

10. A device for detecting containers which have fallen over and/or are damaged in a container mass flow for carrying out the method according to claim 9, with a transporter for the vertical transport of the containers of the container mass flow, at least one camera to capture the container mass flow as an image data stream, and with an image processing unit to evaluate the image data stream, wherein the image processing unit comprises a deep neural network for evaluating the image data stream in order to detect and locate the containers which have fallen over and/or are damaged, the deep neural network is trained with a training data set comprising images of fallen over and/or damaged containers, such that the deep neural network develops a model based on the training data set to distinguish the fallen over and/or damaged containers from each other, the fallen over and/or damaged containers are characterized or marked in the images of the training data set and/or in metadata of the images, the images of the training data set are automatically duplicated to create further images with additional combinations of fallen over and/or damaged containers, image segments are generated during the duplication, each of the image segments comprising a vertical or fallen over and/or damaged container, and the image segments are individually rotated and/or enlarged during the duplication.

11. The device according to claim 10, wherein the image processing unit comprises a storage medium containing machine instructions that, when executed with the image processing unit, evaluate the image data stream with the deep neural network.

12. The method according to claim 4, wherein the ambient conditions are illumination conditions.

13. The method according to claim 7, wherein the fallen over and/or damaged containers are automatically separated from the vertically transported containers of the container mass flow after detection and localization by the deep neural network with a gripper arm or with a switch.

* * * * *